(12) United States Patent
Agon et al.

(10) Patent No.: US 6,393,501 B1
(45) Date of Patent: May 21, 2002

(54) MICROPROCESSOR WITH EXTERNAL MEMORY INTERFACE OPTIMIZED BY AN EARLY DECODE SYSTEM

(75) Inventors: Francois Agon, Crolles; Mark Vos, Grenoble, both of (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/310,562

(22) Filed: May 12, 1999

(30) Foreign Application Priority Data

May 14, 1998 (FR) .............................. 98 06345

(51) Int. Cl.⁷ .................. G06F 13/32; G06F 13/28; G06F 13/38; G06F 13/40
(52) U.S. Cl. .................. 710/56; 710/34; 710/57; 710/35; 711/171; 712/210
(58) Field of Search .............................. 712/38, 39, 24, 712/29, 210, 201; 711/1, 4, 20, 39, 54, 56, 64, 65, 240, 171, 172; 710/57, 32, 33, 34, 35, 36, 56, 58

(56) References Cited

U.S. PATENT DOCUMENTS

| 5,125,079 | A | | 6/1992 | Max .......................... 395/325 |
| 5,175,732 | A | * | 12/1992 | Hendel et al. ............... 370/463 |
| 5,189,671 | A | * | 2/1993 | Cheng ......................... 370/471 |
| 5,247,517 | A | * | 9/1993 | Ross et al. ................... 370/452 |
| 5,590,349 | A | | 12/1996 | Robinson et al. ........... 395/800 |
| 5,675,654 | A | * | 10/1997 | Ryan .......................... 3800/48 |
| 5,737,550 | A | * | 4/1998 | Song .......................... 710/130 |
| 5,778,419 | A | * | 7/1998 | Hansen et al. ............... 711/112 |
| 5,982,816 | A | * | 11/1999 | Ogita et al. ................. 375/240 |
| 5,991,313 | A | * | 11/1999 | Tanaka et al. .............. 370/537 |
| 6,130,894 | A | * | 10/2000 | Ojard et al. ................ 370/421 |

FOREIGN PATENT DOCUMENTS

EP 0 840 233 A1 10/1997 ........... G06F/12/08

* cited by examiner

Primary Examiner—Daniel H. Pan
(74) Attorney, Agent, or Firm—Lisa K. Jorgenson; Allen, Dyer, Doppelt, Milbrath & Gilchrist, P.A.

(57) ABSTRACT

A microprocessor circuit having an external memory interface includes a transmission element for the transmission of binary data packets between the microprocessor and the interface. The interface includes a buffer with a determined capacity for storing the transmitted data elements. The circuit also includes a controller capable of computing the capacity of the buffer that is available or unavailable owing to the storage of the data elements and capable of reporting the status of availability of the buffer to receive an additional packet. A method is also provided for the control of the interface of such a circuit. The interface comprises a decoder for decoding format data of a packet. The format data of a packet being contained in the data packet and each format data decoding operation being given to the controller in order to optimize the use of the storage capacity of the buffer and the transmission between the microprocessor and the external memory.

35 Claims, 3 Drawing Sheets

MICROPROCESSOR WITH EXTERNAL MEMORY INTERFACE OPTIMIZED BY AN EARLY DECODE SYSTEM

FIELD OF THE INVENTION

The present invention relates to the field of microprocessors comprising an external memory interface (EMI).

BACKGROUND OF THE INVENTION

An EMI is an intermediate circuit between a data storage memory and a microprocessor that reads and writes the data elements. The EMI type interface has the function of collecting and relaying data transmissions between the microprocessor and the external memory. These are transmissions in the sense of the writing and reading of data elements in the memory.

Figure 1:
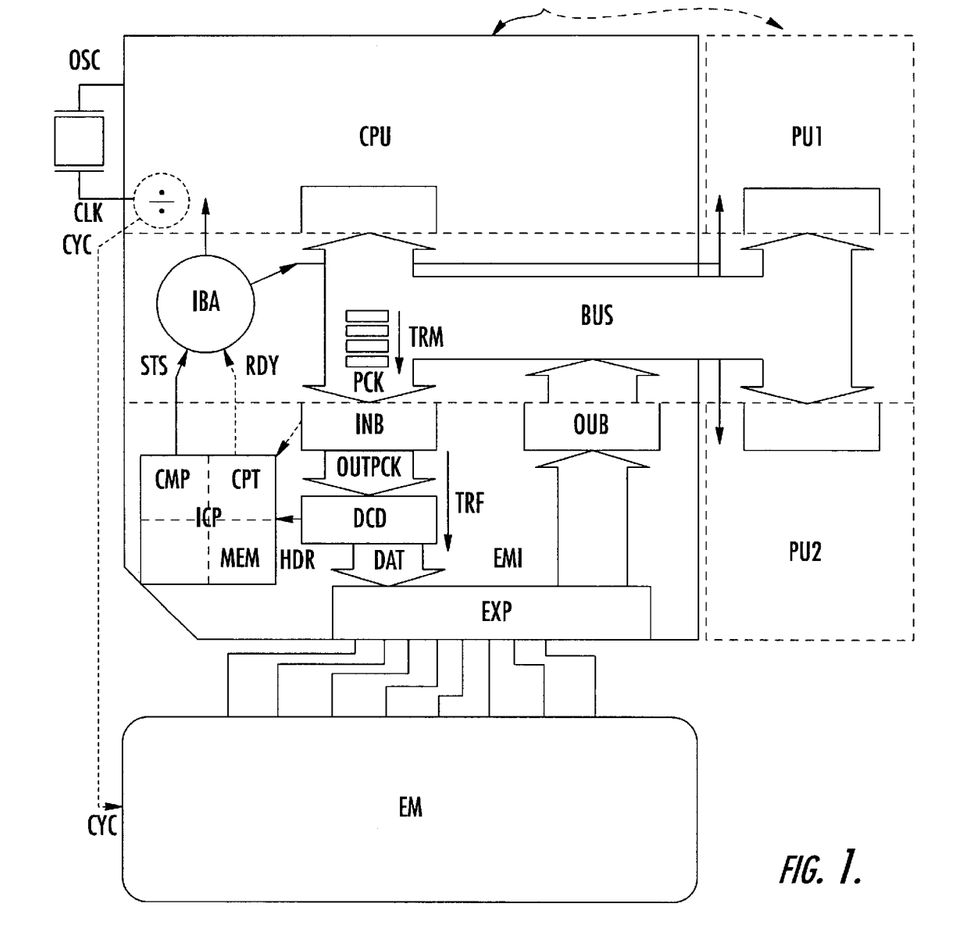
FIG. 1 shows a microprocessor circuit comprising an interface with an external memory and which implements the features of the invention.

The prior art architecture, the components of which are also included in the circuit of FIG. 1, includes the two components, the microprocessor MP pnd the memory EM, generally being separate integrated circuits. The interface EMI is preferably implanted in the integrated circuit of the microprocessor MP. The microprocessor itself may be formed by one or more data processing units. It is then possible to distinguish a central processing unit CPU and peripheral units PU1 and PU2. In a known way, the interface EMI is connected by an internal bus of the microprocessor MP to the central processing unit CPU and, as the case may, be to peripheral units PU1 and PU2. The parallel bus enables the high-speed transmission of the data elements that are read or designed to be read in the external memory EM. The data transmission may come, without distinction, from the central processing unit CPU or from peripherals. An arbitration circuit IBA of the internal bus manages the data transmissions on the bus and the transmission requests made by the units CPU, PU1, PU2 or EMI of the microprocessor.

The interface EMI necessarily has buffers INB, OUB because the access to the external memory EM is generally slower than the transmission of data on the internal bus. Furthermore, the internal bus may be requisitioned for other transmissions while the data elements are recorded in the memory EM by the interface EMI.

A buffer INB connected to the internal bus is thus conventionally planned in the interface EMI to receive and store the data elements sent by the microprocessor MP and designed to be recorded in the external memory EM. The interface EMI comprises another buffer OUB also connected to the internal bus, to store and retransmit the data elements loaded from the external memory EM. These data elements are designed to be transmitted to a unit CPU, PU1 or PU2 of the microprocessor MP. The first stage INB which acts in write mode is called the input buffer and the second stage OUB which acts in the read mode is called the output buffer. In the present description, reference shall be made essentially to the input buffer INB.

Furthermore, the interface EMI comprises an external port EXP connected to terminals of the memory EM. The external port EXP connects the data elements during a transfer Trf coming from the input buffer INB or alternately intended for the output buffer OUB. However, the port EXP generally does not have any storage function such as does a buffer.

In the transmission protocols, there are therefore two types of request; loading (reading of the memory) and recording (writing in the memory). The loading or recording requests may come without distinction from the central processing unit CPU or from peripherals. There are simple transmission protocols known in the prior art. In these protocols, the data elements are recorded or loaded one by one, or more specifically, word by word. A data word has a format specified by the standard of the microprocessor, namely 8, 16, 32 or 64 bits . . . (therefore 1, 2, 4 or 8 bytes . . .). The format of the words corresponds to the number of channels of the internal bus of the microprocessor. A loading request simply comprises a data word containing the indication of the order of loading accompanied by address bits of the memory slot to be read. A recording request then comprises two words. The first word contains general indications: recording order bit accompanied by address bits of the memory slot to be selected for the writing. The second word contains the data elements as such, namely the data elements to be written in the selected memory slot.

The EMI interface then carries out requests of this kind as they are received, in processing the first word and temporarily choosing the second word (in the case of writing) in the buffer INB. With this protocol, the interface has a drawback of not being available throughout the performance time of the request. There are known transmission protocols that are more developed. These provide for the loading or recording of a succession of data elements in several successive memory slots. The value of these protocols is that they accelerate the read or write operations of a sequence of data elements. These operations are relatively frequent. Indeed, the access to a memory slot takes place normally in several phases, namely in several clock cycles. A first phase corresponds to the selection of a first part of the memory address, for example the page number, and a second phase corresponds to the selection of a second part of the memory address, such as the row number. The number of phases may increase according to the range of the accessible addresses. When it is sought to access neighboring memory slots, it is possible to omit the re-selection of the part common to the two addresses. Thus, by bringing together the data elements to be recorded or loaded in a single request, the access phases are condensed and the read/write operations are accelerated. The data elements are then combined in packets of data words.

Figure 3:
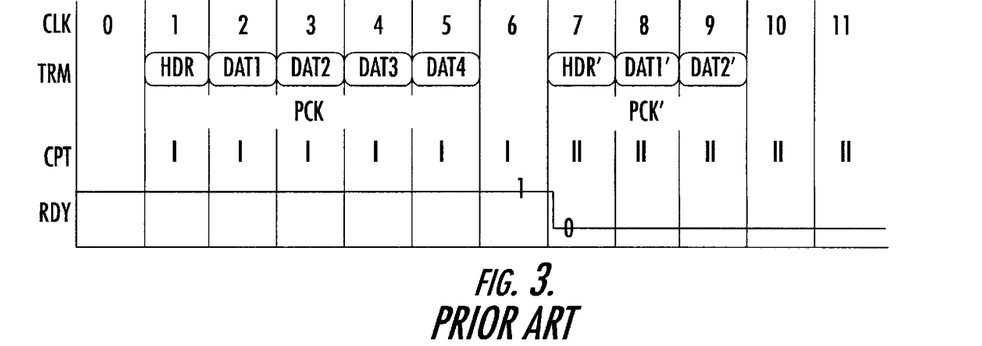
FIG. 3 shows a timing diagram of data transmission between the microprocessor and an interface according to the prior art.

If a recording request concerns four data words, for example as shown in FIG. 3, then the packet Pck comprises five words: a header word Hdr followed by four data words Dat1, Dat2, Dat3 and Dat4. The first word Hdr contains the general information: bits indicating the order of the recording of the packet, accompanied by address bits of the first memory slot that have to be recorded. As above, a load request contains only one data word: bits indicating the loading order accompanied by address bits of the first memory slot that are to be read to form the packet.

There are known microprocessors with external memory interfaces in which the buffer INB can store several packets of words. Thus, a buffer INB having a capacity of ten lines of data elements enables the storage of six words, namely two packets of data elements, assuming that the transmission protocol provides that a packet should comprise five words at most. The utility of increasing the storage capacity of the buffer is that it avoids blocking the microprocessor pending the transcription of a first packet in the memory. However, it must always be planned that the interface EMI will inform the microprocessor MP of the availability status of the buffer INB to prevent another data transmission from being sent to the buffer INB when it is full.

In the known circuits, it is planned that the interface EMI will comprise a counter CPT integrated into the interface control processor ICP. As shown in FIG. 3, the counter CPT accounts for the number of packets stored by the buffer. When the counter CPT indicates that the number of packets stored by the buffer INB has reached the nominal capacity in terms of number of packets, the processor modifies a status signal Rdy given to the arbitration circuit IBA so that this circuit IBA rejects any request for recording of data. In the example of FIG. 3, it is planned that each packet will comprise a maximum of five words and that the buffer will comprise ten lines. As soon as the buffers receives the second packet Pck', while the first packet Pck is still stored, the counter records the packet number II and the signal Rdy goes to the low state 0. This prevents any other transmission.

One drawback of a microprocessor interface circuit of this kind is that the storage is limited to a nominal number of data packets. Another drawback is that the limitation of the packet storage capacity slows down transmissions between the microprocessor and the external memory. Consecutively, the wait for data transmissions may block the computations of the units of the microprocessor. This has the drawback of reducing the computation speed of the microprocessor.

SUMMARY OF THE INVENTION

An object of the invention is to overcome the above-mentioned drawbacks without increasing either the capacity or the amount of space taken up by the buffer. It is an object of the invention to optimize the management of the storage capacity of the buffer and therefore the transmission capacity between the microprocessor and the external memory. In particular, it is an object of the invention to prevent a sub-utilization of the buffer when it stores data packets having a number of words smaller than the maximum get by the protocol.

Another object of the invention is to provide advance information on any future availability of the buffer in order to prepare other data transmissions and organize the arbitration of the transmissions on the bus. Briefly, this object is achieved by providing that the interface will decode each preliminary word of a packet of data words. This decoding relating more specifically to a few bits indicating the format of the packet. These format particulars are used to count up the rows of the buffer occupied by the storage and deduce the availability of the buffer to receive other packets therefrom. This enables the storage of an optimum number of packets. This optimum number may possibly be greater than the nominal number set by the protocol. Furthermore, the decoding of the preliminary word of the packet enables the advance deducing and reporting of the status of future availability of the buffer, namely after the full storage of the packet.

Advantageously, it is planned to carry out a partial early decoding of the format bits before the end of the reception cycle of the preliminary word itself.

The invention is obtained by implementing a method for the control of an external memory interface of a microprocessor. The interface comprising a buffer storing binary data packets transmitted between the microprocessor and the external memory interface, and the buffer having a specified storage capacity of data packets. The method comprising the steps of transmitting data packets between the microprocessor and the interface, storing the data packets in the buffer, computing the capacity of the buffer that is available or unavailable owing to the storage of data packets, and informing the microprocessor of the status of availability or non-availability of the buffer to receive an additional data packet.

The method has the particular feature of decoding format data elements of each data packet, the format data elements being contained in the data packet, and using the decoding of the data packets of each data packet to compute the capacity of the buffer that is available or unavailable owing to the storage of each data packet. This is done to optimize the management of the storage capacity of the buffer and the transmissions between the microprocessor and the interface. A method of this kind is designed especially to be implemented in a microprocessor circuit comprising an interface with an external memory.

Alternatively, the invention is achieved with a microprocessor circuit comprising an external memory interface. The circuit comprises a transmitter for transmitting binary data packets between the microprocessor and the interface. The interface comprising a buffer with a determined capacity storing the transmitted data elements. The circuit also includes a controller capable of computing the capacity of the buffer that is available or unavailable owing to the storage of the data elements and capable of reporting the status of availability of the buffer to receive an additional packet. Additionally, the interface comprises a decoder for decoding format data of a packet, the format data of a packet being contained in the data packet. Each format data decoding operation being given to the controller to optimize the use of the storage capacity of the buffer and the transmission between the microprocessor and the external memory.

Preferably, the decoder is capable of decoding the format data of a packet during the transmission of the packet, the format data of a packet being contained in a preliminary data word of the packet. Preferably, the controller is capable of computing the future capacity of the buffer that will be available or unavailable owing to the storage of the data packet being transmitted and is capable, during the transmission of the packet, of reporting the status of future availability or unavailability of the buffer to receive an additional packet.

According to the preferred embodiment, the decoder is capable of decoding format data elements contained in the preliminary data word during the transmission of the preliminary data word. A preliminary data word containing a few format data bits. According to the preferred embodiment, the controller is capable, during the transmission of the preliminary data word of the data packet, of computing the future capacity of the buffer that will be available or unavailable owing to the storage of the data packet being transmitted. And, the controller is capable, as soon as the transmission of the preliminary data word of the data packet has ended, of reporting the status of future availability or unavailability of the buffer to receive an additional data packet.

BRIEF DESCRIPTION OF THE DRAWINGS

Other features, objects and advantages of the invention shall appear from the following description and drawings given solely as exemplary non-restrictive embodiments. Of the appended figures:

FIGS. 7 to 9 are flow charts of the microprocessor interface programs implemented according to the invention;

DETAILED DESCRIPTION OF THE PREFERRED EMBODIMENTS

Hereinafter in the description, the making and operation of the microprocessor external memory interface will be developed while assuming that the protocol of data transmission between the units of the microprocessor and the interface requires that the packets should contain one preliminary word and zero to four data words, giving a maximum of five words per packet. It is also indicated that the format of the words is 64 bits. The implementation of the invention is absolutely not limited by numerical standards of this kind which are used solely to clearly illustrate the operation.

Figure 4:
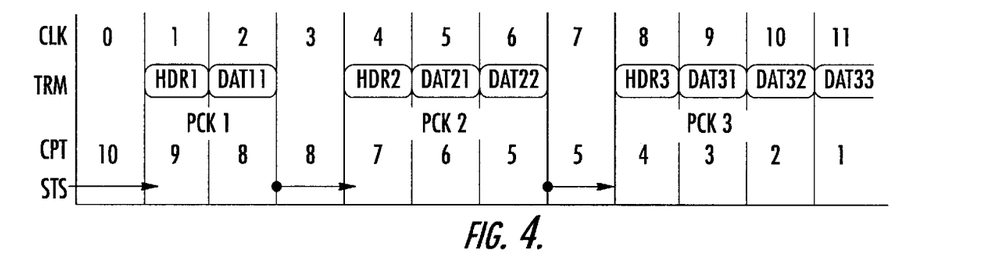
FIGS. 4 and 5 show timing diagrams of data transmission between the microprocessor and the interface according to the invention.

As illustrated in FIG. 4 or FIG. 3, according to a protocol of this kind, a packet of data elements Pck1, Pck2, Pck3 or Pck may respectively comprise 1, 2, 3 or 4 data words, hence 2, 3, 4 or 5 words in all, counting the preliminary word Hdr1, Hdr2, Hdr3 or Hdr. This is the case during a recording request. During a load request transmitted by the internal bus to the EMI type interface, there is no data word to be recorded and the packet comprises simply one request word Hdr.

Each data word is formed by a group of binary state bits 0 or 1. The format of the word, namely the number of data bits contained in the word, in this case 64 bits, is fixed by the standard of the microprocessor and its interface. The internal bus (BUS) comprises parallel lines for the transmission of data elements, in this case 64 in number, since the number of lines is preferably equal to the standard of the microprocessor.

The transmission of a word on the internal bus takes up the duration of one clock cycle Clk. During the clock cycle, all the bits forming the word are presented in parallel to the inputs of the buffer INB which can then block their state to store the word.

An particular feature of the invention is the ability, during the reception of a packet of binary data by the buffer of the interface, to provide for a decoding of the data elements indicating the format of the packet. The advantage of a particular feature of this kind is that it makes it possible to have precise, advance knowledge of the number of lines of the buffer that will be occupied by the storage of the data packets.

Figure 2:
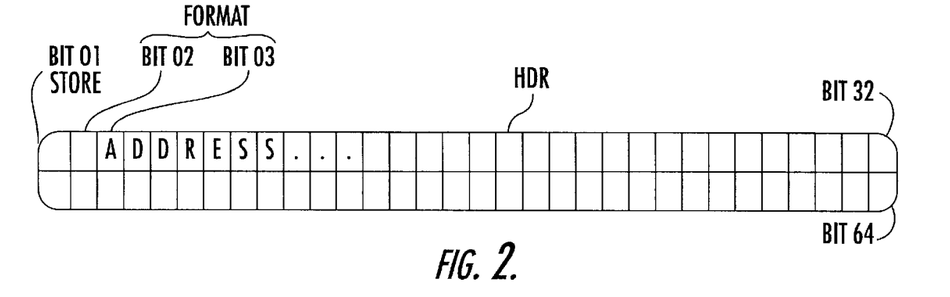
FIG. 2 shows a schematic view of the content of a preliminary data word of a data packet used according to the invention.

FIG. 2 gives a schematic view of an exemplary assembly of data bits, bit01 to bit64, forming a preliminary word Hdr of a packet. A data bit, preferably the first bit01, gives an indication, by its binary state, of whether this preliminary word contains a record request or a load request. Other data bits, for example bit02 and bit03, in their binary code, indicate the number of data words to be recorded or loaded. Thus, we know the number of words of a packet according to the binary code indicated by the format data bits as illustrated, for example, by the following status table for the data bits bit01, bit02 and bit03, indicating the format of the packet.

| bit01 | bit02 | bit03 | Information |
|---|---|---|---|
| 0 | X | X | Load request, 1-word packet to be stored |
| 1 | 0 | 1 | 2-word packet to be stored, including one data word to be recorded |
| 1 | 1 | 0 | 3-word packet to be stored, including two data words to be recorded |
| 1 | 1 | 1 | 4-word packet to be stored, including three data words to be recorded |
| 1 | 0 | 0 | 5-word packet to be stored |

The invention provides for incrementing or decrementing a number by the number of data words contained by the packet. According to a simple embodiment, it is possible to store the entire packet of data elements transmitted by the bus and then decode the data elements indicating the format of the packet, and use the format indications resulting from the decoding to increment a counter. The result of the counter then indicates the number of words stored by the buffer, namely the number of unavailable lines. By comparing the result of the counter with the total number of buffer lines, it is possible therefrom to deduce the available capacity of the buffer.

Alternately, as shown in FIG. 4, the counter CPT may be initialized with the total amount of lines of the buffer, in this case ten, and may be decremented (i.e. the number may be reduced by counting down) according to the format indications resulting from the decoding. In this case, at the end of the reception of the packet, the result of the counter CPT indicates the number of available lines of the buffer. A test or a comparison of the result of the counter with the maximum number of words that may be contained in a packet (according to the transmission protocol) makes it possible to know whether the buffer can receive an additional data packet.

Thus, as illustrated in FIG. 4, when the buffer stores two packets Pck1 and Pck2 of two words and three words, there remain five unoccupied lines and the interface reports its ability to receive a third packet Pck3, always assuming that a packet contains a maximum of five words. The interface then sends a status signal Sts indicating the availability of the buffer to receive an additional packet. According to the preferred embodiment of the invention, the decoding of the data elements indicating the format of the packet is done as soon as the reception of the packet begins. Since it is planned that the data elements of the packet are preliminary data elements of the packet, the status of future availability may thug be known advantageously as soon as the first word of the packet is received. Indeed, as indicated here above, the bits indicating the format of the packet are preferably contained by the first word (the preliminary word Hdr) of the packet.

Figure 5:
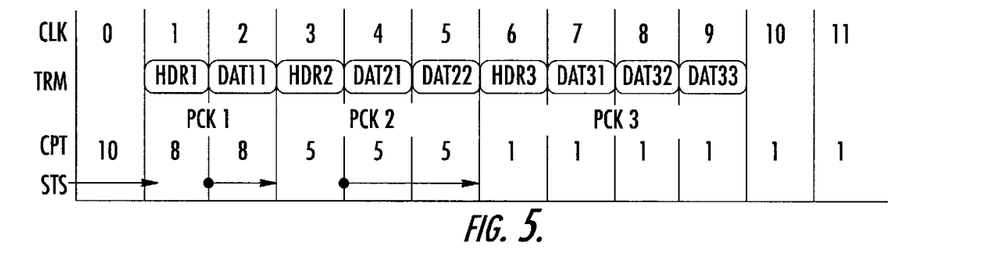

The invention therefore preferably provides for decoding the format indications of the packet as soon as the preliminary word is received and the immediate computation of the status of future availability of the buffer owing to the storage of the packet during transmission. FIG. 5 thus shows that, according to the preferred embodiment, the counter Cpt is decremented by the number of words contained by a packet Pck1, Pck2 or Pck3. In other words, a decrementation by a number 2, 3 or 4 respectively, during the transmission of the preliminary word Hdr1, Hdr2 or Hdr3 of the packet.

FIG. 5 further shows that the signal Sts indicating the availability status of the buffer is generated by the interface before the end of transmission of the packet and even upon the end of transmission of the preliminary word of the packet. It is provided, to this end, that the interface will comprise a control processor ICP which first of all performs a partial and immediate decoding and then simple and fast computations.

Indeed, a logic circuit such as a processor provides a faster result as the logic operations are simple and include few logic indicators. It is therefore planned that the processor will perform a partial decoding of the preliminary word, namely a decoding of only the few bits indicating the format of the packet. This makes it possible to carry out the decoding almost instantaneously, and in any case within a time appreciably smaller than one clock cycle Clk.

The decoding is preferably immediate, namely it starts at the beginning of the cycle 1, 3 or 6 of the clock Clk, during which the preliminary word Hdr1, Hdr2 or Hdr3 is transmitted by the bus to the interface EMI. Thus, the result of the decoding, namely the format indicator of the packet, is obtained during the very course of the first transmission cycle of the preliminary word. Immediately, the controller resumes the format indication of the packet and perform operations of simple computation, namely counting CPT and comparison CMP. This enables the preparation of the status signal Sts of availability in a way that is still almost instantaneous.

Thus, the interface controller may advantageously compute and report the status of future availability and non-availability of the buffer before the end of the cycle of transmission of the preliminary word which contains the format indication bits.

As illustrated in the drawing of FIG. 1, the microprocessor interface according to the invention therefore comprises a decoder DCD and controller such as an interface control processor ICP. The decoder DCD processes the data packet Pck received by the buffer INP to extract the packet format indications contained in the preliminary words Hdr and give them to the controller ICP. The controller ICP performs computations and reports the status Sts of availability to the arbitration circuit IBA of the internal bus. The decoder and controller may be formed of logic circuits having counting functions CPT, comparison functions CMP and possibly storage functions MEM. Alternatively, the decoder and controller may be implemented by programming a processor, especially according to the programs of FIGS. 7 to 9. The decoder and controller may again be preferably included in the integrated circuit in the form of logic circuits made and optimized by computer-assisted design software whose implementation shall not be described in detail in the present description.

Figure 7:
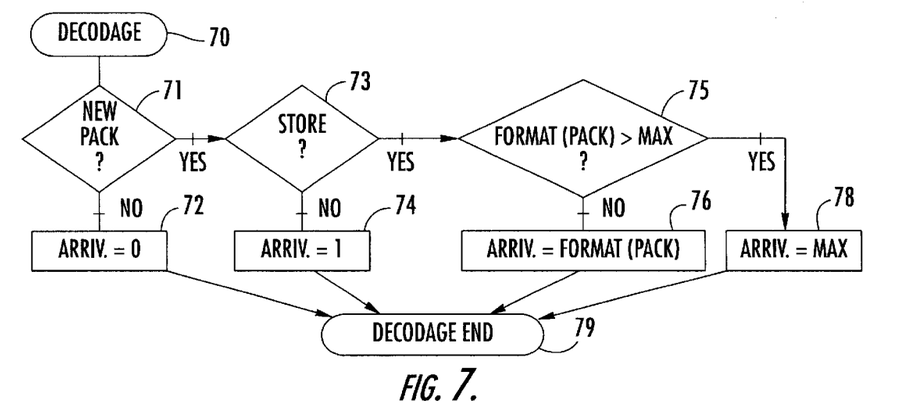
FIG. 7 shows a program for the decoding of format data of a packet.
Figure 8A:
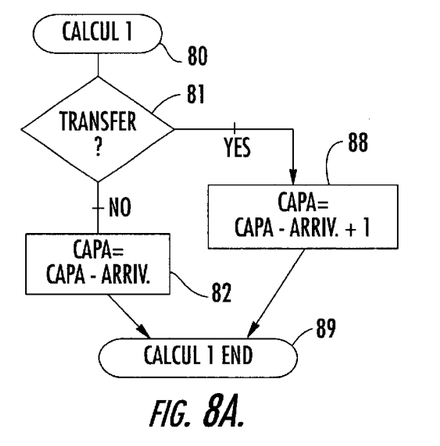
FIGS. 8a and 8b show two alternative programs for the computation of available buffer capacity.
Figure 8B:
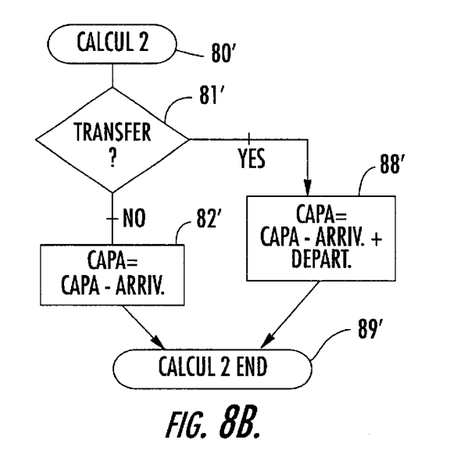

FIG. 7 illustrates a decoding algorithm designed to be implemented in logic circuits or processor programs of the interface according to the invention. In the algorithms of FIGS. 7 and 8, it is provided that a variable Arriv will indicate the number of data words contained by a packet under reception. After starting and initialization steps 70, the decoding algorithm comprises steps 71 to 76, 77 and 79 performing the following operations:

step 71, a NEW indicator indicates whether a packet has been transmitted;

step 72, in the absence of any packet transmission, the variable Arriv is reset at zero;

step 73, in the event of a packet transmission, a STORE indicator test, such as the bit01 of the preliminary word Hdr of the packet, determines whether the transmission pertains to a record request;

step 74, if there is no record request, the variable Arriv is set at one, since the packet contains only one load request word Hdr;

step 75, if there is a record request, the decoding of the format indicator of the packet (Format Pack) is compared with the maximum format Max set by the transmission protocol;

step 76, when the format does not go beyond the maximum, the variable Arriv is loaded with the value of the format of the packet (the value corresponding, for example, to the binary value of the format bits such as bit02 and bit03, of the preliminary word Rdr, plus one unit);

step 78, when the format exceeds the maximum it is planned to load the variable Arriv with the maximum format value Max; and the steps 72, 74, 76 and 78 are followed by the end-of-decoding step 79.

Figure 9:
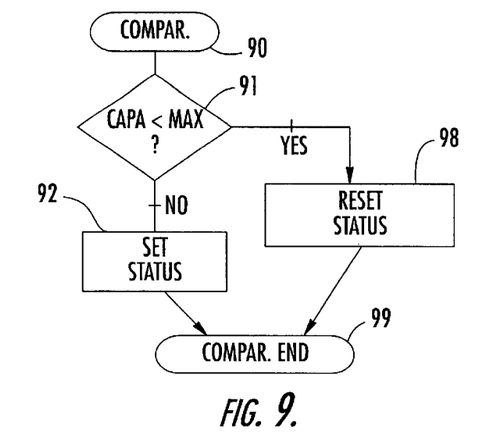
FIG. 9 shows a program for the comparisons of capacity and drawing up reports on the availability status of the buffer.

In the computation algorithms that follow the FIGS. 8–9, a variable Capa indicates the number of available lines of the buffer. During the initialization or when there is no storage of data elements in the buffer, the variable Capa is loaded with the total number of lines of the buffer. In an equivalent way it is possible to develop computation algorithms in which a variable would indicate the number of unavailable lines.

FIG. 8a illustrates an algorithm CALCUL1 enabling the controller to compute the available capacity of the buffer. This algorithm is designed to be implemented in the form of logic circuits or processor programs for the control of the interface according to the invention. After the beginning step 80, the computation algorithm comprises steps 81, 82, 88 and 89 performing the following operations:

in the step 81, an indicator test TRANSFER ascertains that a data packet transfer is in progress between the buffer INB and the external port EXP;

when there is no transfer, the step 82 provides for the subtraction of the value of the variable Arriv from the value of the variable Capa;

if there is a transfer in progress, the step 88 provides that the value of the variable Capa, after subtraction of the value of the variable Arriv, is incremented by one unit (an increment at each cycle for the transfer of one data word); and the final step 89 of the algorithm CALCUL1 is performed after step 88 and step 82.

Thus, preferably, the microprocessor circuit according to the invention comprises controller ICP capable of counting down a number of lines of the buffer occupied by the data storage Capa, and of deducting a number Arriv of words from the data packet being transmitted, according to the decoding of the format data given by the decoder DCD (DECODING). Also, the controller ICP is capable of computing CMP (COMPAR) the number Capa of lines of the buffer available owing to the storage of the words of the data packet during transmission.

FIG. 9 illustrates an algorithm COMPAR enabling the controller to compare the available capacity of the buffer with the maximum format of a data packet planned according to the transmission protocol. A status indicator indicating the availability status of the buffer to receive an additional data packet is modified according to the result of the comparison. The status indicator corresponds to the status signal Sts sent by the controller of the interface. By convention, the indicator is in the active state 1 to indicate the availability and in the inactive state 0 to indicate the unavailability.

After the beginning step 90, the comparison algorithm comprises steps 91, 92, 98 and 99 performing the following operations:

at the step 91, a test indicates whether the value of the variable Capa is below the value Max which is the maximum number of words contained in a data packet, according to the protocol;

if the available capacity is greater than or equal to the maximum format of the packets, the step 92 provides for setting the status indicator in the state 1, thus activating the availability status signal Sts;

if the available capacity is less than the maximum format, the step 98 provides for resetting the status indicator in the state 0, thus deactivating the status signal Sts (non-availability);

the end-of-comparison step 99 follows the steps 92 and 98 and completes the program of the interface.

Thus, preferably, the microprocessor circuit comprises the controller ICP which is further capable of counting CPT, CALCUL2, a starting number of lines of the buffer released by the transfer Trf of a packet Pck of data towards the external memory EM. It can be clearly seen in FIGS. 7 to 9 that the decoding, computation and comparison algorithms naturally follow one another.

However, FIG. 8b indicates a preferred alternative algorithm CALCUL2 enabling the controller to compute the available capacity of the buffer in an optimal manner. Indeed, the algorithm of FIG. 8b takes account of an additional data element: the number of data words contained by a packet being transferred. This number is memorized by a variable Depart. The algorithm CALCUL2 of FIG. 8b differs from the algorithm CALCUL1 of FIG. 8a only in the step 88. The operation is as follows:

during a transfer of a data packet between the buffer and the external port, the step 88' provides that the value of the variable Capa, with the value of the variable Arriv having been subtracted, is increased by the value of the variable Depart.

The advantage of taking into account the format of a packet that is being transferred (coming out of the buffer) is that it provides a premature report of the availability status of the buffer to the microprocessor.

Figure 6:
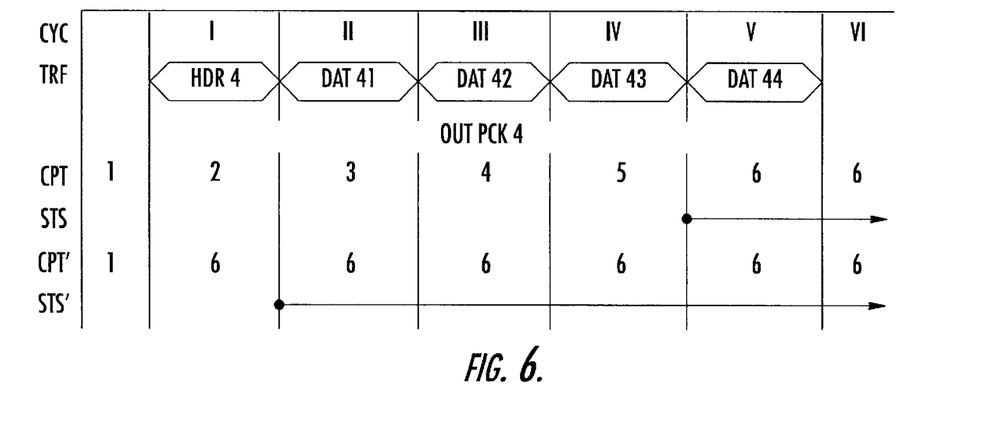
FIG. 6 shows a timing diagram of data transmission between an interface and an external memory according to the invention.

This advantage can be seen in the timing diagram of FIG. 6 which illustrates an operation for the removal from storage or "unstoring" of data from a data packet Outpck4. The operation relates to a transfer Trf of five data words Hdr4, Dat41, Dat42, Dat43 and Dat44 from the buffer INB to the external port EXP and the memory EM.

The two indications Cpt and Sts that are shown first in FIG. 4 correspond to the results of the computation counter and the availability status signal that are obtained following the algorithm CALCUL1 of FIG. 8a. The counter Cpt is thus decremented by one unit when each data word is transferred from the packet Outpck4, therefore at each recording cycle I, II, III, IV or V.

Secondly, FIG. 4 indicates the results of the capacity computation counter Cpt' and availability status signal Sts' obtained according to the algorithm CALCUL2 of FIG. 8b. It is noted that, as soon as the preliminary word Hdr4 is transferred during the recording cycle I, the format indication of the packet Outpck4, namely five words, is accounted for by the counter Cpt', the result increasing by five units during the first cycle I. Thus, as soon as the transfer begins, the counter Cpt' indicates that the number of lines released is greater than five. This leaves place for the reception of a new packet.

The taking into account of the format of the data packets coming out of the buffer thus enables the early computation of the available or unavailable capacity of the buffer owing to the removal from storage of data elements. After this, the controller may transmit the availability status signal Sts' of the buffer, as soon as the cycle I for the transfer of the preliminary word has ended. The arbitration circuit IBA of the internal bus of the microprocessor then receives early warning of the future availability status of the buffer.

The circuit IBA may use this information so that the microprocessor units prepare other data transmissions. The circuit IBA may thus use this information to immediately permit a transmission of data elements.

The management of the buffer is then optimal since the buffer may receive a data word to be stored as a data word is removed from storage.

This implementation is appropriate if the transcription of data elements from the interface into the external memory is done at the same rate as the transmission of data elements from the microprocessor to the interface. In this case, the algorithm CALCUL2 advantageously enables a continuous data stream line.

However, the cycles for the transcription of the data words from the interface into the memory are often lengthier than the cycles of transmission of data words from the microprocessor into the interface. A transmission cycle is extended over a number of clock cycles, that is an integer, generally two or four, whereas a transmission cycle lasts only one clock cycle as is suggested by a comparison between FIGS. 5 and 6. In this case, it is preferable to implement the algorithm CALCUL1 or modify the algorithm CALCUL2 to take account of the ratio of the transcription and transmission rates.

It can be further noted that the format indication of a transferred packet may be given either by re-memorizing the format indication decoded and memorized during the storage of this packet or by performing a new decoding of the data elements indicating the format during the removal of data elements from storage in the packet.

Finally, as indicated in FIG. 1, the controller ICP (in particular the interface control processor) preferably has a counter CPT to perform computations, a comparator to prepare the status availability report and the signal Sts, and a memory MEM to retain the data elements indicating the formats of the packets stored and give these indications during the removal of data elements from storage.

Other embodiments shall appear to those skilled in the art without departing from the scope of the present invention, as defined by the following claims.

That which is claimed is:

1. A microprocessor for communication with an external memory, the microprocessor comprising:

an external memory interface; and a transmitter for transmitting data packets between the microprocessor and the interface; the external memory interface comprising a buffer with a predetermined capacity for storing transmitted data packets, a controller for computing an available or unavailable storage capacity of the buffer, and for reporting an additional packet availability status of the buffer, and a decoder for decoding format data contained in a data packet, and for providing decoded format data to the controller to increase an efficiency of the use of the storage capacity of the buffer and transmissions between the microprocessor and the external memory.

2. A microprocessor according to claim 1, wherein the decoder decodes format data of a packet word during the transmission of the data packet, the format data of a data packet being contained in a preliminary data word of the packet.

3. A microprocessor circuit according to claim 2, wherein the decoder decodes format data contained in the preliminary data word during a transmission of the preliminary data word, and wherein the preliminary data word contains format data bits.

4. A microprocessor according to claim 2, wherein the controller, during transmission of the preliminary data word of the data packet, computes a future capacity of the buffer that will be available or unavailable in view of storage of a data packet being transmitted.

5. A microprocessor according to claim 2, wherein the controller, as soon as a transmission of the preliminary data word of the data packet has ended, reports a future availability or unavailability of the buffer to receive an additional data packet.

6. A microprocessor according to claim 1, wherein the controller, during transmission, reports a future availability or unavailability of the buffer to receive an additional packet.

7. A microprocessor according to claim 1, wherein the controller computes a future capacity of the buffer that will be available or unavailable in view of a storage of a data packet being transmitted.

8. A microprocessor according to claim 1, wherein the controller stores the decoded format data of a data packet stored by the buffer to reference the decoded format data during a transfer of the data packet between the buffer and the external memory.

9. A microprocessor according to claim 8, wherein the controller computes the capacity of the buffer that is available in view of the transfer of the data packet.

10. A microprocessor according to claim 1, wherein the decoder performs a new decoding of the format data of a packet during a transfer of the data packet between the buffer and the external memory.

11. A microprocessor according to claim 10, wherein the controller computes the capacity of the buffer that is available in view of the transfer of the data packet.

12. A microprocessor according to claim 1, wherein the controller compares the available storage capacity of the buffer with a maximum format of the data packets and for of determining, from the comparison, the availability of the buffer to receive an additional data packet.

13. A microprocessor comprising:
  an external memory interface; and
  a transmitter for transmitting data between the microprocessor and the external memory interface;
  the external memory interface comprising
    a buffer for storing transmitted data,
    a controller for computing an available storage capacity of the buffer to increase an efficient use of the buffer, and
    a decoder for decoding format data contained in the transmitted data, and for communicating with the controller to increase the efficient use of the buffer based upon the decoded format data.

14. A microprocessor according to claim 13, wherein the decoder decodes format data of a packet word during the transmission of the data, and wherein the format data is contained in a preliminary data word of the transmitted data.

15. A microprocessor circuit according to claim 14, wherein the decoder decodes format data contained in the preliminary data word during a transmission of the preliminary data word, and wherein the preliminary data word contains format data bits.

16. A microprocessor according to claim 14, wherein the controller, during a transmission of the preliminary data word, computes a future capacity of the buffer that will be available or unavailable in view of transmitted data storage.

17. A microprocessor according to claim 14, wherein the controller, as soon as a transmission of the preliminary data word has ended, reports a future availability or unavailability of the buffer to receive additional data.

18. A microprocessor according to claim 13, wherein the controller, during data transmission, reports a future available storage capacity of the buffer.

19. A microprocessor according to claim 13, wherein the controller computes a future available storage capacity of the buffer.

20. A microprocessor according to claim 13, wherein the controller stores the decoded format data.

21. A microprocessor according to claim 13, wherein the controller compares the available storage capacity of the buffer with a maximum format of the data and determines, from the comparison, the availability of the buffer to receive additional data.

22. A method for the controlling an external memory interface of a microprocessor, the external memory interface comprising a buffer storing data packets transmitted between the microprocessor and the external memory interface, the buffer having a predetermined data packet storage capacity, the method comprising the steps of:
  transmitting data packets between the microprocessor and the external memory interface;
  storing the data packets in the buffer;
  decoding format data contained in each data packet;
  computing an available or unavailable capacity of the buffer in view of the storage of data packets and using decoded format data; and
  determining an availability or non-availability of the buffer to receive an additional data packet to increase an efficient management of the storage capacity of the buffer and the transmissions between the microprocessor and the external memory interface.

23. A method according to claim 22, wherein the format data is decoded during the transmission of the data packet, and wherein the format data of a data packet is contained in a preliminary data word of the packet.

24. A method according to claim 23, wherein the format data is decoded during the transmission of the preliminary data word of the data packet.

25. A method according to claim 22, further comprising the step of computing a future available or unavailable storage capacity of the buffer in view of the storage of a data packet being transmitted, using the decoded format data of the data packet being transmitted, and during a transmission of the data packet.

26. A method according to claim 25, wherein the future available or unavailable storage capacity of the buffer is computed during a transmission of the preliminary data word of the data packet.

27. A method according to claim 22, further comprising the step of determining, during the transmission of a data packet, a future availability or unavailability of the buffer to receive an additional data packet.

28. A method according to claims 27, wherein the future availability or unavailability of the buffer is determined as soon as the transmission of the preliminary data word of the data packet has ended.

29. A method for the control of an external memory interface of a microprocessor, the interface comprising a buffer storing data transmitted between the microprocessor and the external memory interface, the method comprising the steps of:

transmitting data between the microprocessor and the external memory interface;

storing the data in the buffer;

decoding format data contained in the data; and computing an available storage capacity of the buffer based upon the decoded format data to increase an efficient management of the storage capacity of the buffer.

30. A method according to claim 29, further comprising the step of determining an availability of the buffer to receive additional data.

31. A method according to claim 29, wherein the format data is decoded during a data transmission and is contained in a preliminary data word of the data.

32. A method according to claim 31, wherein the format data is decoded during a transmission of the preliminary data word of the data.

33. A method according to claim 31, further comprising the step of computing a future available storage capacity of the buffer during a transmission of the preliminary data word.

34. A method according to claim 29, further comprising the step of computing a future available storage capacity of the buffer.

35. A method according to claim 29, further comprising the step of determining a future availability of the buffer to receive additional data.

* * * * *

UNITED STATES PATENT AND TRADEMARK OFFICE
CERTIFICATE OF CORRECTION

PATENT NO. : 6,393,501 B1
DATED : May 21, 2002
INVENTOR(S) : Francois Agon and Mark Vos It is certified that error appears in the above-identified patent and that said Letters Patent is hereby corrected as shown below:

Column 1,
Line 21, delete "pnd" insert -- and --

Column 2,
Lines 29-30, delete "as the case may, be" insert -- as the case may be, --

Column 3,
Line 9, delete "buffers receives" insert -- buffer receives --
Line 30, delete "get" insert -- set --
Line 38, delete "relating" insert -- relates --

Column 4,
Line 39, delete "containing" insert -- contains --
Line 59, delete "content" insert -- contents --

Column 5,
Line 51, delete "An" insert -- A --

Column 6,
Line 53, delete "thug" insert -- thus --

Column 7,
Line 24, delete "perform" insert -- performs --

Column 11,
Line 46, delete "and for of" insert -- and for --

UNITED STATES PATENT AND TRADEMARK OFFICE
CERTIFICATE OF CORRECTION

PATENT NO.    : 6,393,501 B1
DATED         : May 21, 2002
INVENTOR(S)   : Francois Agon and Mark Vos

It is certified that error appears in the above-identified patent and that said Letters Patent is hereby corrected as shown below:

<u>Column 12,</u>
Line 25, delete "for the controlling" insert -- for controlling --
Line 64, delete "claims" insert -- claim --

Signed and Sealed this

Twenty-sixth Day of November, 2002

*Attest:*

*Attesting Officer*

JAMES E. ROGAN
*Director of the United States Patent and Trademark Office*